US012726912B2

(12) United States Patent
Goldstein et al.

(10) Patent No.: US 12,726,912 B2
(45) Date of Patent: Sep. 1, 2026

(54) AUTOMATIC OPTIMIZATION OF NOMINAL POWER PARAMETER IN UPLINK POWER CONTROL

(71) Applicant: Dell Products L.P., Round Rock, TX (US)

(72) Inventors: Eran Goldstein, Montreal (CA); Mohammed Abdelsadek, Kanata (CA); Manbir Kaur, Brampton (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 326 days.

(21) Appl. No.: 18/418,494

(22) Filed: Jan. 22, 2024

(65) Prior Publication Data

US 2025/0240734 A1 Jul. 24, 2025

(51) Int. Cl.
*H04W 52/14* (2009.01)
*H04W 52/24* (2009.01)

(52) U.S. Cl.
CPC ....... *H04W 52/146* (2013.01); *H04W 52/241* (2013.01)

(58) Field of Classification Search
CPC ............. H04W 52/146; H04W 52/241; H04W 52/225; H04W 52/242; H04W 52/245; H04W 52/0245; H04W 52/0238; H04W 52/243
See application file for complete search history.

(56) References Cited

U.S. PATENT DOCUMENTS

| | | | | |
|---|---|---|---|---|
| 9,143,308 | B2 * | 9/2015 | Han | H04W 52/226 |
| 2013/0039173 | A1 * | 2/2013 | Ehsan | H04W 52/146 370/229 |
| 2015/0146529 | A1 * | 5/2015 | Mayginnes | H04W 16/14 370/235 |
| 2021/0029653 | A1 * | 1/2021 | Zhang | H04W 52/367 |
| 2022/0191799 | A1 * | 6/2022 | Xu | H04W 52/10 |

(Continued)

OTHER PUBLICATIONS

3GPP "5G; NR; Physical layer procedures for control (3GPP TS 38.213 version 15.11.0 Release 15)" 3GPP, Nov. 2020, 112 pages.

*Primary Examiner* — Andrew Wendell
(74) *Attorney, Agent, or Firm* — Amin, Turocy & Watson, LLP

(57) ABSTRACT

Automatic optimization of the nominal power parameter in uplink power control (e.g., using a computerized tool), is enabled. For example, a system can comprise a processor and a memory that stores executable instructions that, when executed by the processor, facilitate performance of operations. The operations can comprise determining ratio data representative of a received signal to interference and noise ratio of a transmission, of a group of cellular transmissions, via a cellular node. The operations can further comprise, based on the ratio data, determining a power control metric applicable to uplink power control for user equipment. The operations can further comprise, based on the power control metric, determining a nominal power parameter for each uplink channel involving the cellular node. The operations can further comprise applying the nominal power parameter to subsequent connections made via the cellular node subsequent to the determining of the nominal power parameter.

20 Claims, 10 Drawing Sheets

(56) References Cited

U.S. PATENT DOCUMENTS

| | | | | |
|---|---|---|---|---|
| 2022/0286968 | A1* | 9/2022 | Dusenberry | H04W 24/08 |
| 2022/0408286 | A1* | 12/2022 | Kumar | H04W 52/10 |
| 2024/0073825 | A1* | 2/2024 | Lee | H04W 52/42 |
| 2024/0259877 | A1* | 8/2024 | Moore | H04W 16/14 |
| 2025/0007631 | A1* | 1/2025 | Silverman | H04B 17/318 |

* cited by examiner

AUTOMATIC OPTIMIZATION OF NOMINAL POWER PARAMETER IN UPLINK POWER CONTROL

BACKGROUND

Uplink power control plays a significant role in the fifth generation (5G) new radio (NR) air interface, for instance, to ensure an appropriate level of uplink signal-to-noise-plus-interference ratio (SINR), while minimizing interference to the other user equipment (UE). In this regard, the nominal power is an open loop power control parameter that adjusts the uplink SINR at the gNB's receiver. The nominal power is assigned to UEs during the radio resource control (RRC) configuration, and is used for subsequent physical uplink channel/signal transmissions. This parameter is of notable significance during initial transmissions, for instance, as the closed loop power commands take some time to adjust the transmit power to the required level due to its incremental mode of operation. Conventionally, the uplink nominal power parameter has been determined by a network, for instance, based on the design of the gNB's receiver, and considering interference and fading margins.

The above-described background relating to uplink power control is merely intended to provide a contextual overview of some current issues and is not intended to be exhaustive. Other contextual information may become further apparent upon review of the following detailed description.

DETAILED DESCRIPTION

Figure 1:
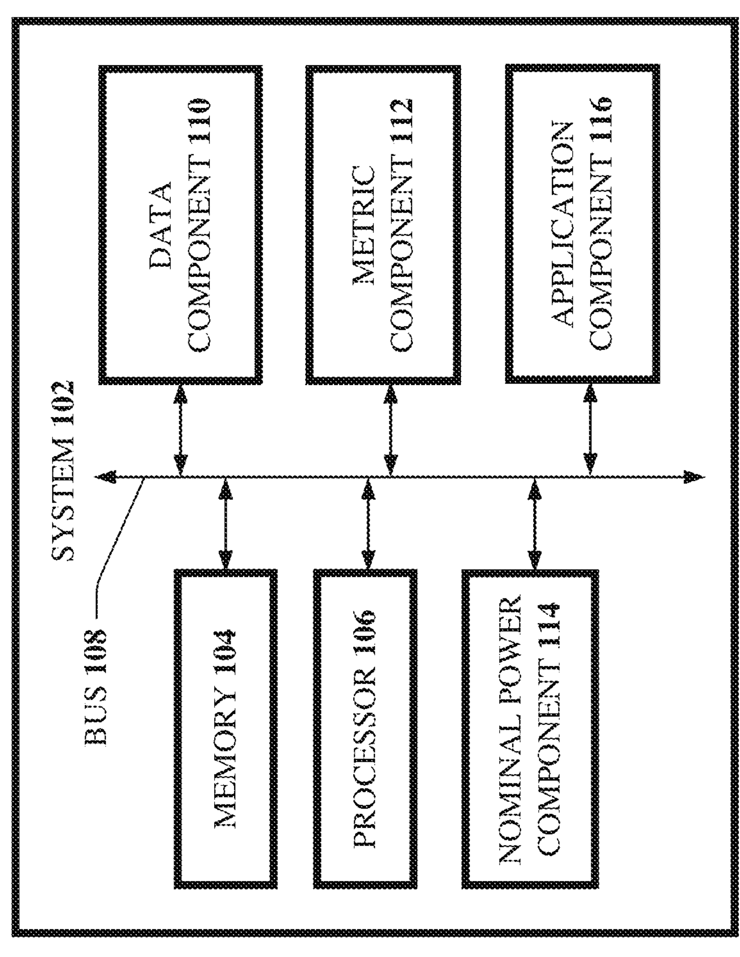
FIG. 1 is a block diagram of an exemplary system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, the uplink nominal power parameter has conventionally been determined by a network, for instance, based on the design of the gNB's receiver, and considering interference and fading margins. However, this approach of selecting the value of this parameter has several shortcomings, for instance, due to the varying environment of fading and interference. The static selection of this parameter can overestimate or underestimate the receiver and channel quality conditions. If this parameter is not selected accurately, initial transmissions of the physical uplink channel/signal can fail, for instance, due to low SINR, transmit power too high, or in some cases, cause interference to other UEs until the closed loop power control commands achieve the aimed performance. Such shortcomings can be even worse, for instance, when a UE is switching from cell to cell more frequently (e.g., moving along a highway). In this case, the UE does not spend much time in each cell. Therefore, the open loop power control parameters would be more significant for more time. Accordingly, the current approach of selecting the value of this parameter impacts the effectiveness of the uplink power control mechanism and the system's overall performance.

In this regard, uplink power control can be improved in various ways, and various embodiments are described herein to this end and/or other ends. The disclosed subject matter relates to uplink power control and, more particularly, to automatic optimization of the nominal power parameter in uplink power control.

According to an example embodiment, a system can comprise a processor, and a memory that stores executable instructions that, when executed by the processor, facilitate performance of operations, comprising determining ratio data representative of a received signal to interference and noise ratio of a transmission, of a group of cellular transmissions, via a cellular node, based on the ratio data, determining a power control metric applicable to uplink power control for user equipment, based on the power control metric, determining a nominal power parameter for each uplink channel involving the cellular node, and applying the nominal power parameter to subsequent connections made via the cellular node subsequent to the determining of the nominal power parameter.

In one or more example embodiments, the power control metric can be a function of a mean of received signal to interference and noise ratios, comprising the received signal to interference and noise ratio, of the transmission. In one or more example embodiments, the power control metric can be a function of a standard deviation of received signal to interference and noise ratios, comprising the received signal to interference and noise ratio, of the transmission. In one or more example embodiments, the power control metric can be a function of a histogram of received signal to interference and noise ratios, comprising the received signal to interference and noise ratio, of the transmission. In one or more example embodiments, the power control metric can be a function of a cumulative distribution function of received signal to interference and noise ratios, comprising the received signal to interference and noise ratio, of the transmission. In one or more example embodiments, the power control metric can be a function of a complementary cumulative distributive function of received signal to interference and noise ratios, comprising the received signal to interference and noise ratio, of the transmission.

In various embodiments, the determining of the nominal power parameter can comprise determining the nominal power parameter based on a configured fraction of pathloss to be compensated via the cellular node.

In various embodiments, the determining of the nominal power parameter can comprise determining the nominal power parameter based on at least one received signal power measurement of the transmission, of the group of cellular transmissions, via the cellular node. In this regard, the at least one received signal power measurement can comprise a received signal strength indicator applicable to the transmission and/or a reference signal received power applicable to the transmission.

In various embodiments, the cellular node can be part of a self-organizing network.

In various embodiments, the nominal power parameter can represent a target normalized received power for each uplink channel involving the cellular node.

In various embodiments, the determining of the power control metric can comprise determining the power control metric based on a threshold minimum quantity of data points applicable to the power control metric.

In various embodiments, the determining of the power control metric can comprise determining the power control metric in response to a defined threshold amount of time being determined to have elapsed from commencement of the transmission.

In various embodiments, the nominal power parameter can comprise a first nominal power parameter of a first nominal power profile associated with a first defined condition, and wherein respective nominal power profiles are employable via the cellular node based on respective defined conditions. In this regard, the respective defined conditions can comprise respective times of day.

In another example embodiment, a non-transitory machine-readable medium can comprise executable instructions that, when executed by a processor, facilitate performance of operations, comprising, determining a received signal strength indicator of a transmission, of a group of cellular transmissions, via a cellular node, based on the received signal strength indicator of the transmission, determining a power control metric applicable to user equipment uplink power control, based on the power control metric, determining a nominal power parameter of each uplink channel to the cellular node, and using the nominal power parameter for subsequent connections via the cellular node.

In various embodiments, the power control metric can be based on a cumulative distribution function of received signal strength indicators, comprising the received signal strength indicator, of the transmission.

In yet another example embodiment, a method can comprise determining, by network equipment comprising a processor, a reference signal received power of a transmission, of a group of cellular transmissions, via a cellular node, based on the reference signal received power of the transmission, determining, by the network equipment, a power control metric applicable to uplink power control for user equipment, based on the power control metric, determining, by the network equipment, a nominal power parameter applicable to each uplink channel to the cellular node, and after determining the nominal power parameter, applying, by the network equipment, the nominal power parameter to subsequent connections via the cellular node.

In various embodiments, the power control metric can comprise an application of a cumulative distribution function of reference signal received powers, comprising the reference signal received power, of the transmission.

Example embodiments herein enable automatic optimization of the selection of the uplink nominal power parameter in the context of self-organizing networks (SON). For this purpose, the can gNB keep track of the SINR of the first transmissions of uplink channels/signals. The nominal power can then be adjusted based on the statistics (see, e.g., FIGS. 3, 4, and 5) of those recorded values, and the updated nominal power parameter can be utilized for the subsequent connections. In various embodiments, several profiles can be utilized, for instance, if the above-noted statistics are determined (e.g., via the gNB) to demonstrate consistency over certain defined situations (e.g., time of the day).

The received power at the gNB's receiver for the uplink channels and signals should be sufficiently high, for instance, to enable decoding the uplink transmissions successfully. However, higher transmit power levels can drain the UE's battery more quickly and/or cause interference to the other UEs. Therefore, uplink power control can comprise a crucial role, for instance, in adjusting UE's transmit power to ensure an appropriate level of the received SINR while minimizing interference to the other UEs.

In this regard, in the third-generation partnership project's (3GPP's) fifth generation (5G) new radio (NR), the transmit power of the physical uplink shared channel (PUSCH), the physical uplink control channel (PUCCH), and the sounding reference signal (SRS) can be simplified in the following form:

$$P_t = \min\{P_{CMAX}, P_0 + \alpha \cdot PL + 10 \cdot \log_{10}(2^{\mu} \cdot M_{RB}) + \Delta_{TF} + \delta\}$$

where:

$P_{CMAX}$ is the maximum allowed transmit power per carrier;

$P_0$ is the nominal power, which can be defined as the target received power per one resource block (RB) with subcarrier spacing of 15 kHz;

PL is the estimated pathloss at the UE based on a downlink reference signal (channel state information reference signal (CSI-RS) or synchronization signal block (SSB));

$\alpha$ is the fraction of pathloss to be compensated ($\leq 1$), which is configured by the network;

$\mu$ and $M_{RB}$ are the numerology of subcarrier spacing and the number of allocated RBs, respectively, which are used to scale the transmit power based on the allocated bandwidth;

$\Delta_{TF}$ is a factor that is used to take into account the information rate transmitted on the uplink channel; and $\delta$ is a term used to dynamically adjust the uplink power incrementally by means of transmit power commands (TPCs) sent to the UE via the downlink control information (DCI).

The subject disclosure herein focuses on the uplink nominal power, i.e., the $P_0$ parameter. This parameter represents the target normalized (i.e., per one RB with 15 kHz subcarrier spacing) received power for the uplink channel/signal.

The selection of the uplink nominal power parameter is not specified by 3GPP, and is instead left for vendor/operator implementation. The network (e.g., via a cellular node or system herein) determines the value of this parameter based on the design of the gNB's receiver and the interference level. It is communicated (e.g., via a cellular node herein) to the UE during Radio Resource Control (RRC) configuration and used for all the subsequent physical uplink channel/signal transmissions. This is different from the other power control parameters (except a), for instance, that are dynamically configured using DCI during slot transmissions. Accordingly, the optimization of the selection of this parameter is of high importance, for instance, to ensure effective power control during uplink slot transmissions. This parameter is of notable significance, for instance, during the initial transmissions as the closed loop power commands need some time to adjust the transmit power to the required level. For example, if the nominal power was set to a high level, the UE would transmit with higher than needed power and cause interference to other users until the dynamic TPCs reduce the power to an appropriate level. On the other hand, if it is set to a lower value, the uplink transmissions may not be successfully decodable until the TPCs increase the UE's transmit power. This TPC adjustment takes some time due to its incremental way of operation. Besides, this is worse when the UE is switching from cell to cell more frequently (e.g., moving on a highway). In this case, the UE does not spend a long time in each cell. Therefore, the open loop power control parameters would be more significant for more time.

An approach to determine this parameter can be to calculate the minimum required SINR to achieve sufficient performance in terms of the block error rate (BLER), the bit error rate (BER), and/or the probability of detection. Then, by considering certain margins for interference, fading, and noise level, the nominal power can be calculated. For example, a typical calculation can be as follows:

$$P_0 = \text{SINR\_min} + \mathit{ThermalNoise} + \mathit{NoiseFigure} + \mathit{InterferenceMargin} + \mathit{FadingMargin},$$

where SINR_min and ThermalNoise are the minimum SINR and noise power per 1 RB with 15 kHz subcarrier spacing, respectively.

However, the interference level and the fading environment can vary with time. Therefore, assuming values for interference, fading, and noise figure might not be the correct guess. An alternative approach, which is measuring the values before setting up the site, can be expensive. Therefore, static selection of this parameter could overestimate or underestimate the receiver conditions, which impacts the effectiveness of the uplink power control mechanism and the system performance.

Figure 2:
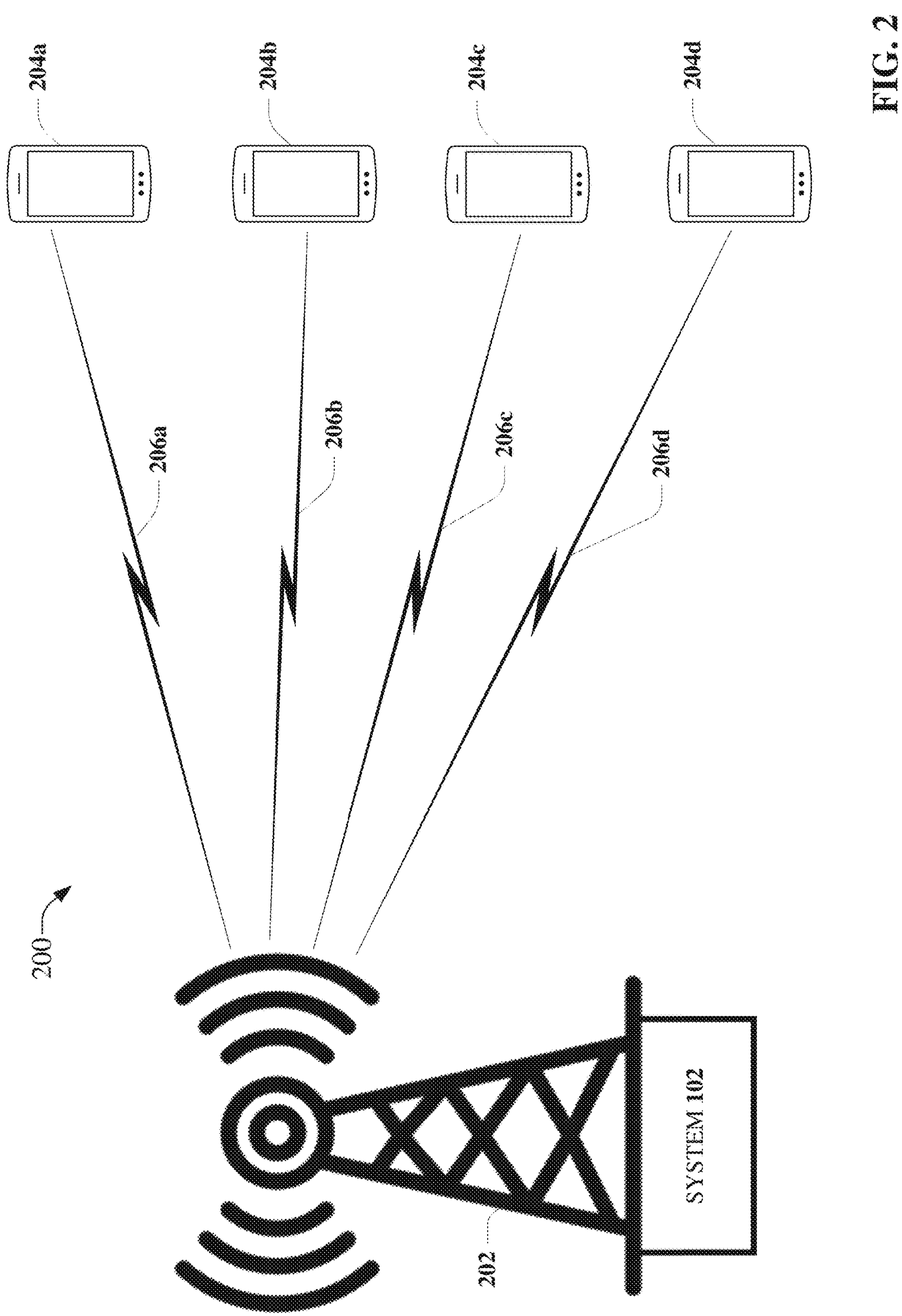
FIG. 2 is a block diagram of an exemplary network in accordance with one or more example embodiments described herein.

Turning now to FIG. 1, there is illustrated an example, non-limiting system 102 in accordance with one or more example embodiments herein, while FIG. 2 illustrates a block diagram of an example network 200 in accordance with one or more example embodiments described herein. System 102 can comprise a computerized tool, which can be configured to perform various operations relating to automatic optimization of the nominal power parameter in uplink power control. The system 102 can comprise one or more of a variety of components, such as memory 104, processor 106, bus 108, data component 110, metric component 112, nominal power component 114, and/or application component 116. In various embodiments, one or more of the memory 104, processor 106, bus 108, data component 110, metric component 112, nominal power component 114, and/or application component 116 can be communicatively or operably coupled (e.g., over a bus or wireless network) to one another to perform one or more functions of the system 102. In various embodiments, the system 102 can be communicatively coupled to one or more UEs 204 via respective cellular transmissions 206 (e.g., comprising respective uplink channels described herein).

In various embodiments, the data component 110 can determine ratio data representative of a received SINR of a transmission, of a group of cellular transmissions (e.g., cellular transmissions 206*a*, 206*b*, 206*c*, and/or 206*d*), via a cellular node 202. In one or more embodiments, the transmission can be a first transmission of a group of transmissions comprising the transmission (e.g., from one or more respective UEs 204). SINR herein can be calculated, for instance, by measuring signal power, interference power, and noise power, and using a defined SINR calculation process to determine the SINR of the transmission. It is noted that, in various embodiments, the cellular node 202 (e.g., a gNB) can be part of a self-organizing network 200. It is further noted that the cellular node 202 can comprise and/or be communicatively coupled to the system 102. In this regard, nodes or components of the network 200 (e.g., cellular node 202) can automatically configure, optimize, and/or maintain themselves without human intervention.

In various embodiments, the metric component 112 can, based on the ratio data (e.g., representative of SINR), determine a power control metric applicable to uplink power control for user equipment (e.g., UE 204*a*, 204*b*, 204*c*, and/or 204*d*). In various embodiments, the power control metric can be a function of a mean of received SINRs, comprising the received SINR, of the transmission (e.g., a first transmission of an uplink channel/signal from a UE before closed-loop power control is utilized). In further embodiments, the power control metric can be a function of a standard deviation of received SINRs, comprising the received SINR, of the transmission. In further embodiments, the power control metric can be a function of a histogram of received SINRs, comprising the received SINR, of the transmission. In further embodiments, the power control metric can be a function of a CDF of received SINRs, comprising the received SINR, of the transmission. In further embodiments, the power control metric can be a function of a complementary cumulative distributive function (CCDF) of received SINRs, comprising the received SINR, of the transmission.

In various embodiments, the determining (e.g., via the metric component 112) of the power control metric can comprise determining the power control metric based on a threshold minimum quantity of data points applicable to the power control metric. Such a minimum quantity of data points can be predefined, or can be determined via the metric component 112 (e.g., using machine learning). In further embodiments, the determining (e.g., via the metric component 112) of the power control metric can comprise determining the power control metric in response to a defined threshold amount of time being determined to have elapsed from commencement of the transmission. Such a defined threshold amount of time can be predefined, or can be determined via the metric component 112 (e.g., using machine learning).

In various embodiments, the nominal power component 114 can, based on the power control metric, determine a nominal power parameter for each uplink channel (e.g., of respective cellular transmissions 206*a*, 206*b*, 206*c*, and/or 206*d*) involving the cellular node 202. In various embodiments, the determining (e.g., via the nominal power component 114) of the nominal power parameter can comprise determining the nominal power parameter based on a configured fraction of pathloss to be compensated via the cellular node 202. In further embodiments, the determining (e.g., via the nominal power component 114) of the nominal power parameter can comprise determining the nominal power parameter based on at least one received signal power measurement of the transmission, of the group of cellular transmissions, via the cellular node 202. In this regard, the at least one received signal power measurement can comprise a received signal strength indicator applicable to the transmission and/or a reference signal received power applicable to the transmission. In various embodiments, the nominal power parameter can represent a target normalized received power for each uplink channel involving the cellular node 202.

In various embodiments, the nominal power parameter can comprise a first nominal power parameter of a first nominal power profile associated with a first defined condition. In this regard, respective nominal power profiles can be employable via the cellular node 202 based on respective defined conditions. In various embodiments, the respective defined conditions can comprise respective times of day, days of week, weeks of month, months of year, UE location, or other suitable defined conditions.

In various embodiments, the application component 116 can apply the nominal power parameter to subsequent connections made via the cellular node 202 subsequent to the determining of the nominal power parameter. In this regard, the nominal power parameter can be applied to the UEs 204 or other suitable UEs or devices (e.g., that are not depicted herein).

According to another embodiment, the data component 110 can determine a received signal strength indicator of a transmission (e.g., a first transmission of an uplink channel/signal from a UE before closed-loop power control is utilized), of a group of cellular transmissions (e.g., cellular transmissions 206*a*, 206*b*, 206*c*, and/or 206*d*), via a cellular node 202. The metric component 112 can then, based on the received signal strength indicator of the transmission, determine a power control metric applicable to user equipment uplink power control. In various embodiments, the power control metric can be based on a cumulative distribution function of received signal strength indicators, comprising the received signal strength indicator, of the transmission (e.g., a first transmission of an uplink channel/signal from a UE before closed-loop power control is utilized). The nominal power component 114 can then, based on the power control metric, determine a nominal power parameter of each uplink channel to the cellular node 202. The application component 116 can then use the nominal power parameter for subsequent connections via the cellular node 202.

According to another embodiment, the data component 110 can determine a reference signal received power of a transmission, of a group of cellular transmissions (e.g., cellular transmissions 206*a*, 206*b*, 206*c*, and/or 206*d*, via a cellular node 202. The metric component 112 can then, based on the reference signal received power of the transmission (e.g., a first transmission of an uplink channel/signal from a UE before closed-loop power control is utilized), determine a power control metric applicable to uplink power control for user equipment (e.g., UE 204*a*, 204*b*, 204*c*, and/or 204*d*). In various embodiments, the power control metric can comprise an application of a cumulative distribution function of reference signal received powers, comprising the reference signal received power, of the transmission (e.g., a first transmission of an uplink channel/signal from a UE before closed-loop power control is utilized). The nominal power component 114 can then, based on the power control metric, determine a nominal power parameter applicable to each uplink channel to the cellular node 202. The application component 116 can then, after determining (e.g., via the nominal power component 114) the nominal power parameter, apply the nominal power parameter to subsequent connections via the cellular node 202.

Figure 3:
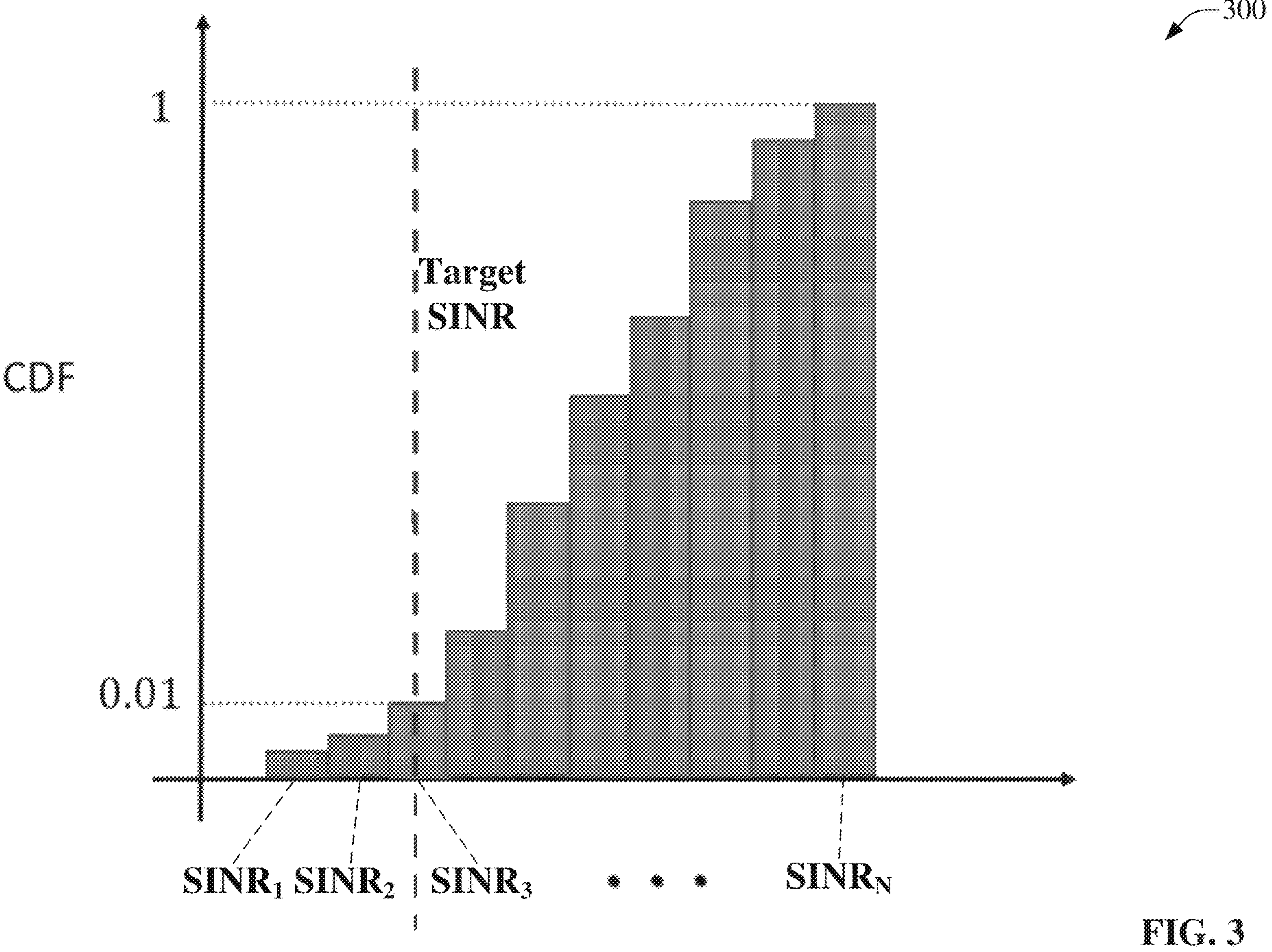
FIG. 3 is an example instance of a cumulative distributive function (CDF) of a scenario in which the uplink nominal power parameter may not need to be updated.
Figure 4:
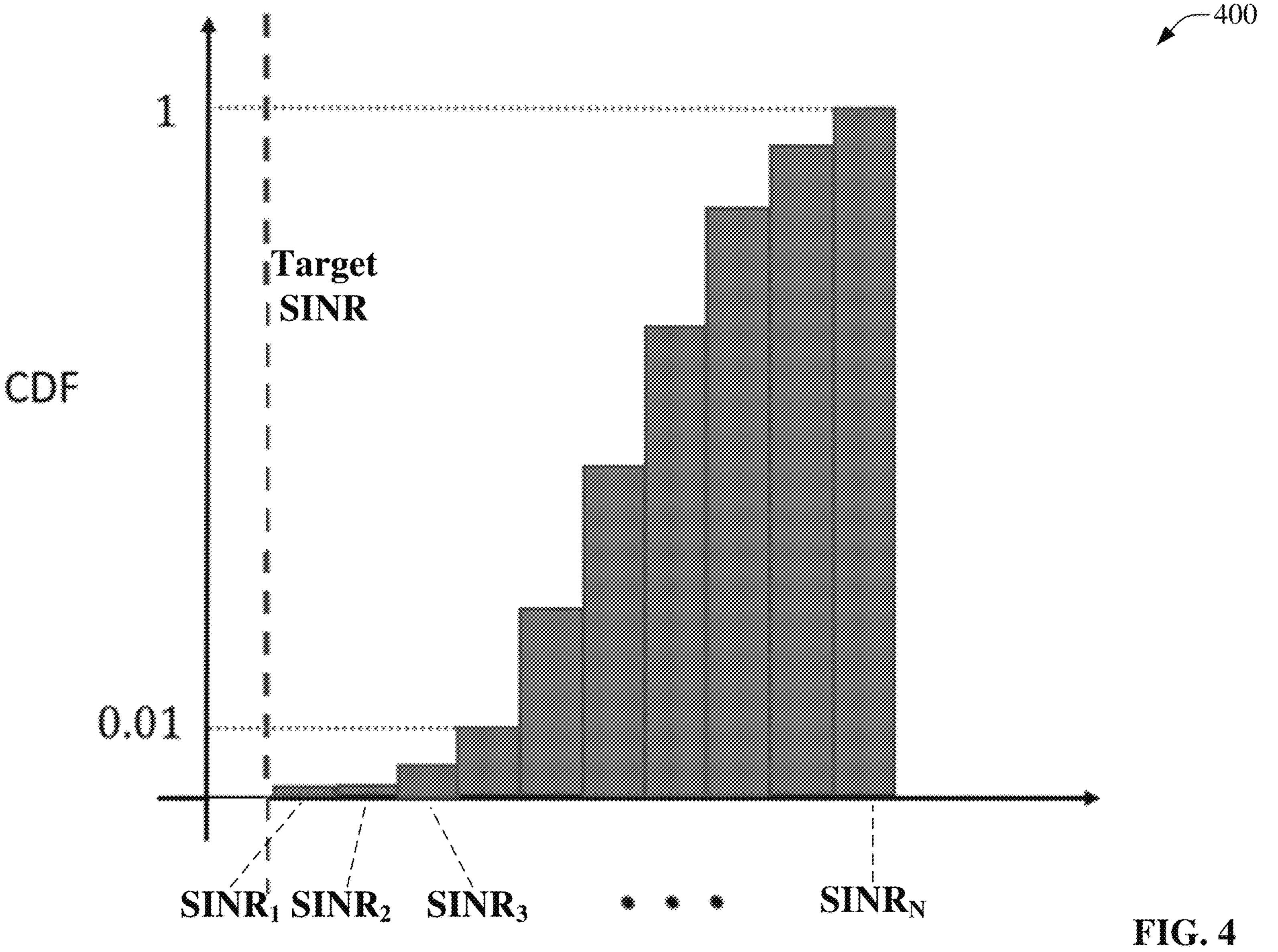
FIG. 4 is an example instance of a CDF of a scenario in which uplink nominal power parameter may need to be decreased.
Figure 5:
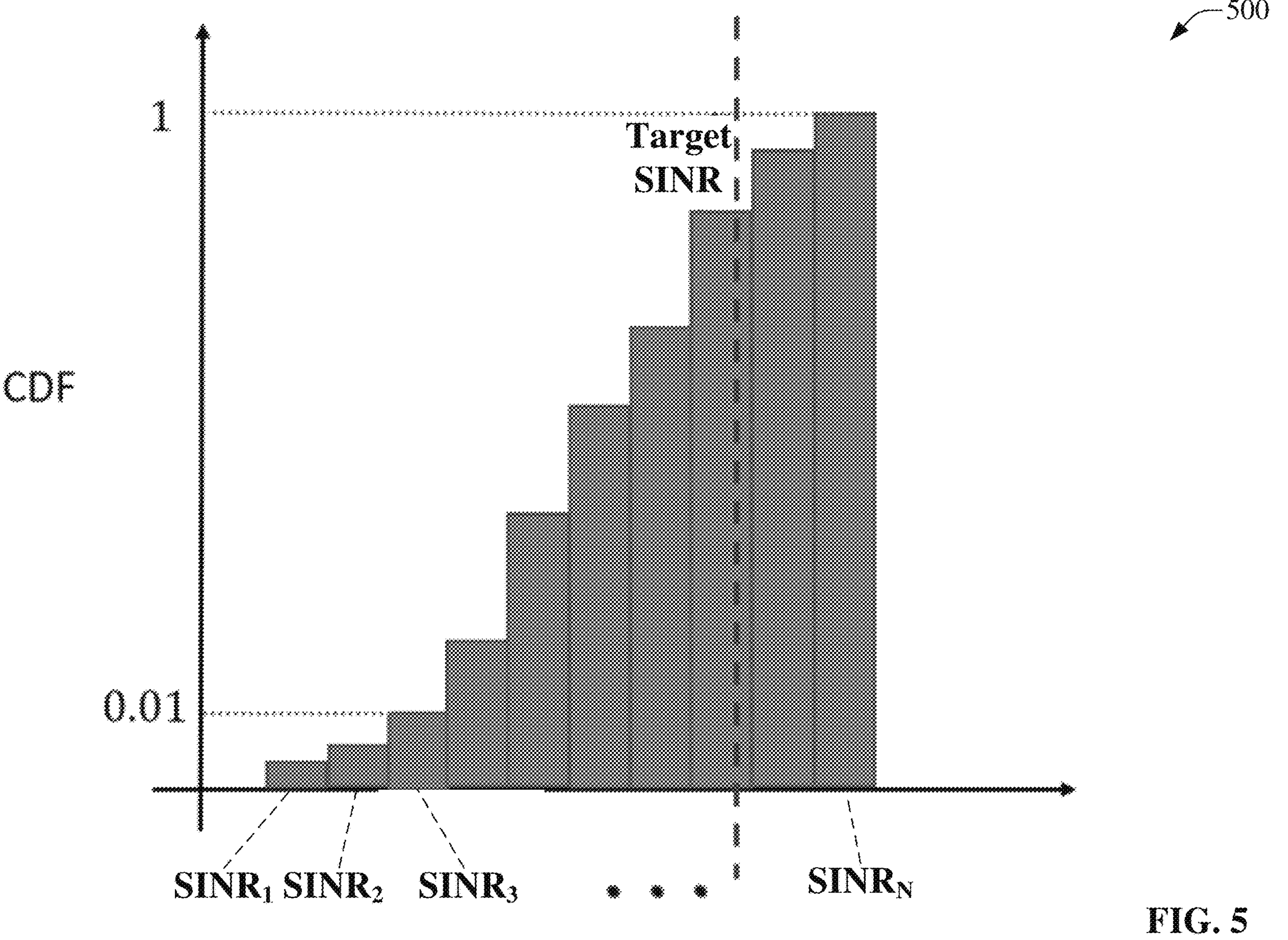
FIG. 5 is an example instance of a CDF of a scenario in which uplink nominal power parameter may need to be increased.

FIGS. 3-5 illustrate example CDFs in accordance with one or more embodiments described herein. For example, CDF 300 comprises a scenario in which the uplink nominal power parameter may not need to be updated. In another example, CDF 400 comprises a scenario in which uplink nominal power parameter may need to be decreased. In yet another example, CDF 500 comprises a scenario in which uplink nominal power parameter may need to be increased. As discussed, example embodiments herein enable auto-optimization of the selection of the uplink nominal power parameter. This mechanism can be considered as part of the general framework of SONs herein.

For each uplink channel/signal, the gNB (e.g., cellular node 202) can keep track of the received SINR of the first transmission. For example, for PUSCH, the gNB (e.g., cellular node 202) can record the received SINR of PUSCH transmissions with message-3 (random access channel (RACH)-related transmission over PUSCH), which is the first transmission on PUSCH.

The gNB (e.g., cellular node 202) can then calculate a defined/predetermined suitable statistical metric (e.g., mean and standard deviation, histogram, cumulative distribution function (CDF), complementary cumulative distribution function (CCDF), etc.) based on the recorded received SINR of the first transmissions per channel. The configured value of $\alpha$ can be considered in this step such that the path loss fraction $((1-\alpha)\cdot PL)$ that is not compensated by the UE is considered in the received SINR versus target SINR.

The gNB (e.g., cellular node 202) can adjust the nominal power parameter, $P_0$, of each uplink channel based on the calculated statistical metric of the received SINR and uses the updated nominal power for the subsequent connections via the gNB (e.g., cellular node 202).

For example, assuming that the CDF can be used as the statistical metric, FIG. 3 illustrates a scenario in which the uplink nominal power parameter may not need to be updated. This is because, for instance, the used $P_0$ value makes most of the transmissions above the target SINR, with a very small proportion lower than the target SINR (e.g., 1% in FIG. 3).

On the other hand, FIGS. 4 and 5 show example instances of CDF for cases in which the uplink nominal power parameter should be decreased or increased, respectively. In FIG. 4, the configured $P_0$ value is too high such that most of the received transmissions have higher than required values, which may cause interference to other users until the TPCs reduce it back after a defined number of slots. In FIG. 5, a relatively large portion of the transmissions falls below the target SINR. This means that there could be a high level of interference that reduces the received SINR. Therefore, the value of $P_0$ can be increased for the subsequent connections.

It is noted that a minimum defined number of data points has to be received, or a minimum defined amount of time has to pass, for averaging, before the system 102 updates nominal power based on the statistical data. Those minimum values can be left as configurable parameters in various embodiments herein. In addition, the target SINR values that the network (e.g., via the system 102) sets for the uplink channel at the receiver side are also configurable parameters in various embodiments herein.

The network 200 via the cellular node 202 can also utilize the received signal power measurements (using the received signal strength indicator (RSSI) or the reference signal received power (RSRP)) to update the nominal power parameter. For example, if the received power is relatively very high, the system 102 can reduce the nominal power parameter. It is note that this information cannot be deduced from the SINR measurements only.

To reduce the computational complexity and increase the efficiency even more, several nominal power profiles can be utilized (e.g., via the system 102). That is, if the statistics of the SINR of first transmissions showed consistency over certain situations, different profiles can be used for each situation. For example, a nominal power value can be used in the morning, another one in the afternoon and evening, and/or a third one overnight. Moreover, this whole process can run continuously (e.g., via the system 102), or from time to time, to adjust the nominal power control parameter based on the environment and use the adjusted value for some time.

Figure 6:
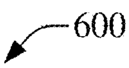
FIG. 6 is a block flow diagram for a process associated with automatic optimization of the nominal power parameter in uplink power control in accordance with one or more example embodiments described herein.
Figure 6:
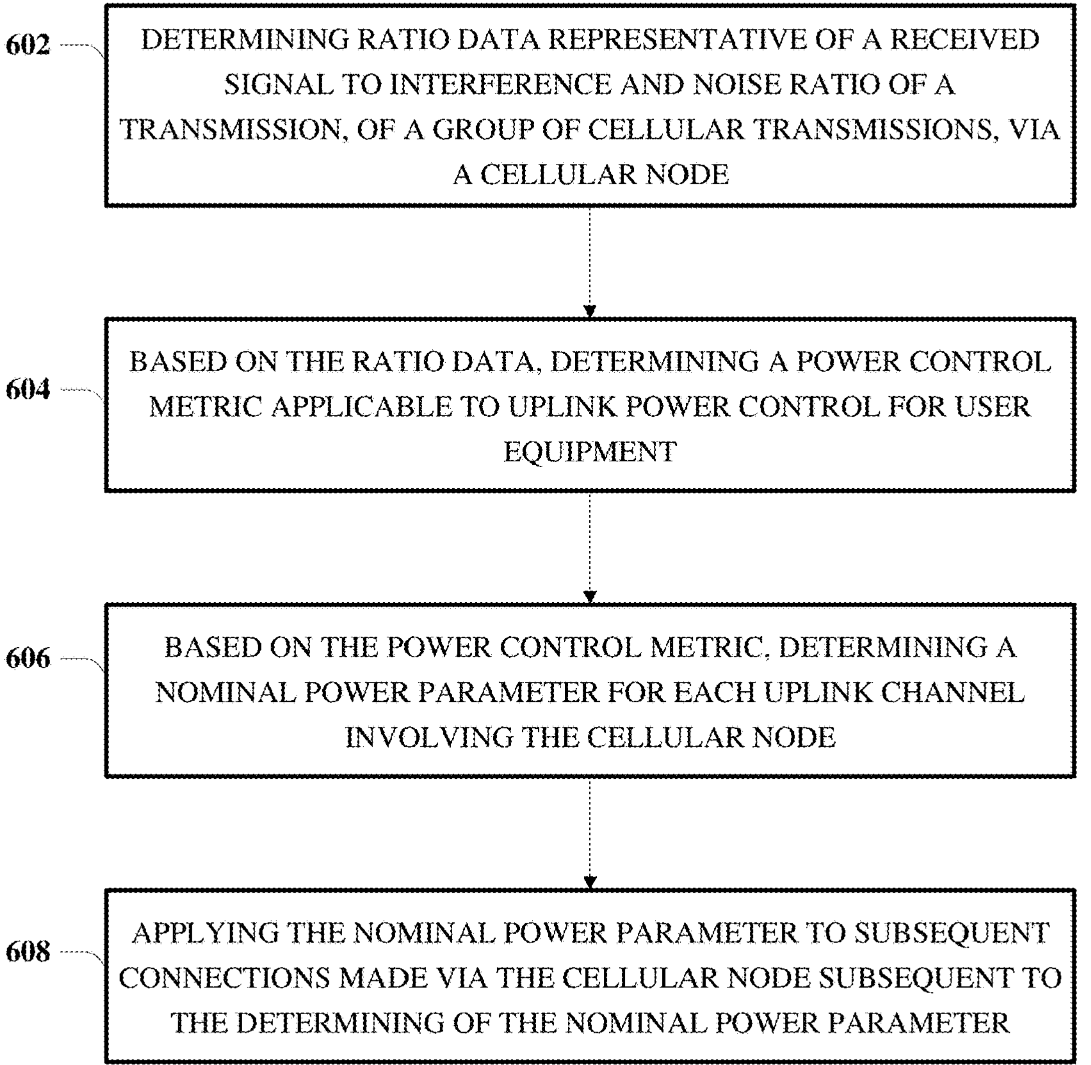

FIG. 6 illustrates a block flow diagram for a process 600 associated with automatic optimization of the nominal power parameter in uplink power control in accordance with one or more embodiments described herein. At 602, the process 600 can comprise determining (e.g., via the data component 110) ratio data representative of a received signal to interference and noise ratio of a transmission, of a group of cellular transmissions, via a cellular node (e.g., cellular node 202). At 604, the process 600 can comprise, based on the ratio data, determining (e.g., via the metric component 112) a power control metric applicable to uplink power control for user equipment (e.g., UE 204). At 606, the process 600 can comprise, based on the power control metric, determining (e.g., via the nominal power component 114) a nominal power parameter for each uplink channel involving the cellular node (e.g., cellular node 202). At 608, the process 600 can comprise applying (e.g., via the application component 116) the nominal power parameter to subsequent connections made via the cellular node (e.g., cellular node 202) subsequent to the determining of the nominal power parameter.

Figure 7:
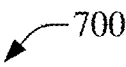
FIG. 7 is a block flow diagram for a process associated with automatic optimization of the nominal power parameter in uplink power control in accordance with one or more example embodiments described herein.
Figure 7:
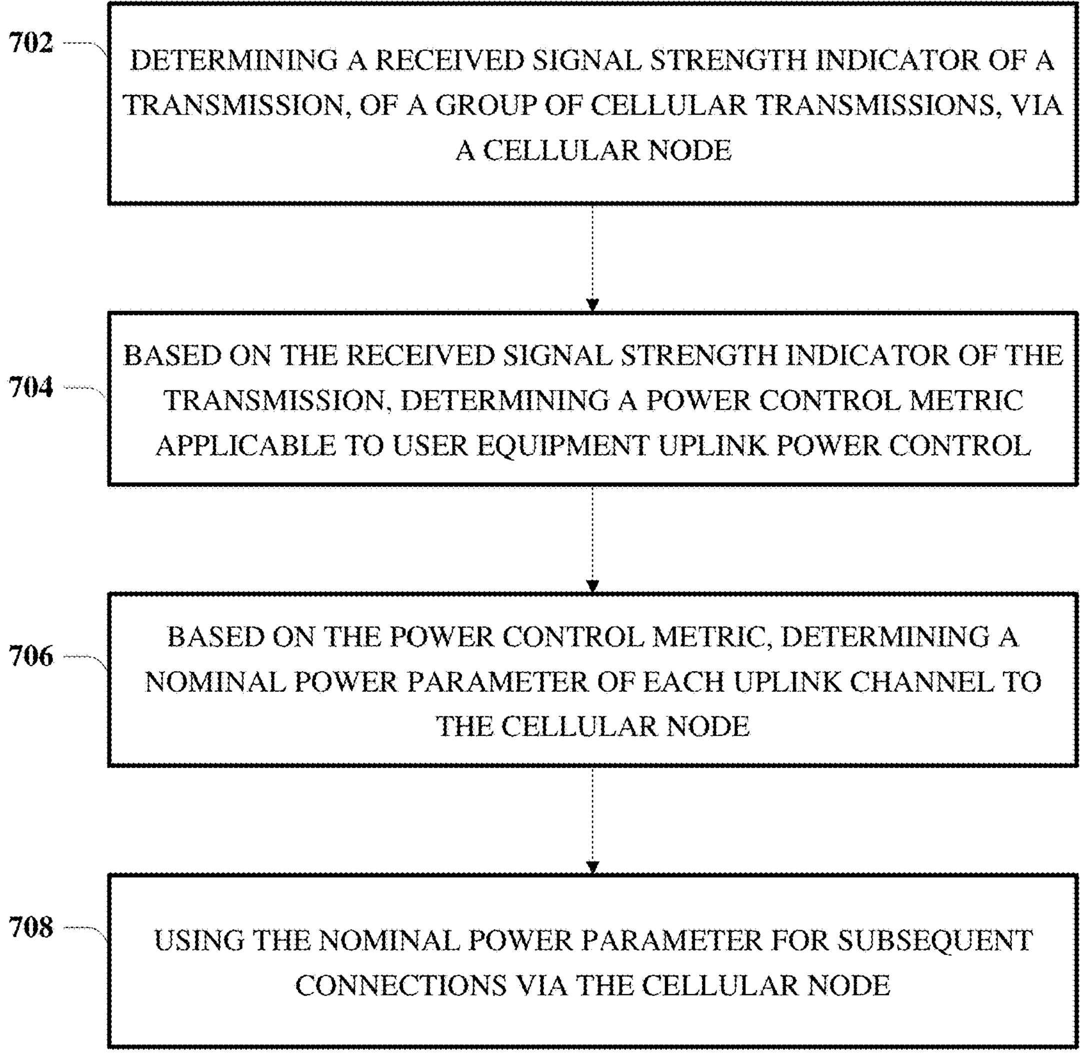

FIG. 7 illustrates a block flow diagram for a process 700 associated with automatic optimization of the nominal power parameter in uplink power control in accordance with one or more embodiments described herein. At 702, the process 700 can comprise determining (e.g., via the data component 110) a received signal strength indicator of a transmission, of a group of cellular transmissions, via a cellular node (e.g., cellular node 202). At 704, the process 700 can comprise, based on the received signal strength indicator of the transmission, determining (e.g., via the metric component 112) a power control metric applicable to user equipment uplink power control. At 706, the process 700 can comprise, based on the power control metric, determining (e.g., via the nominal power component 114) a nominal power parameter of each uplink channel to the cellular node (e.g., cellular node 202). At 708, the process 700 can comprise, using (e.g., via the application component 116) the nominal power parameter for subsequent connections via the cellular node (e.g., cellular node 202).

Figure 8:
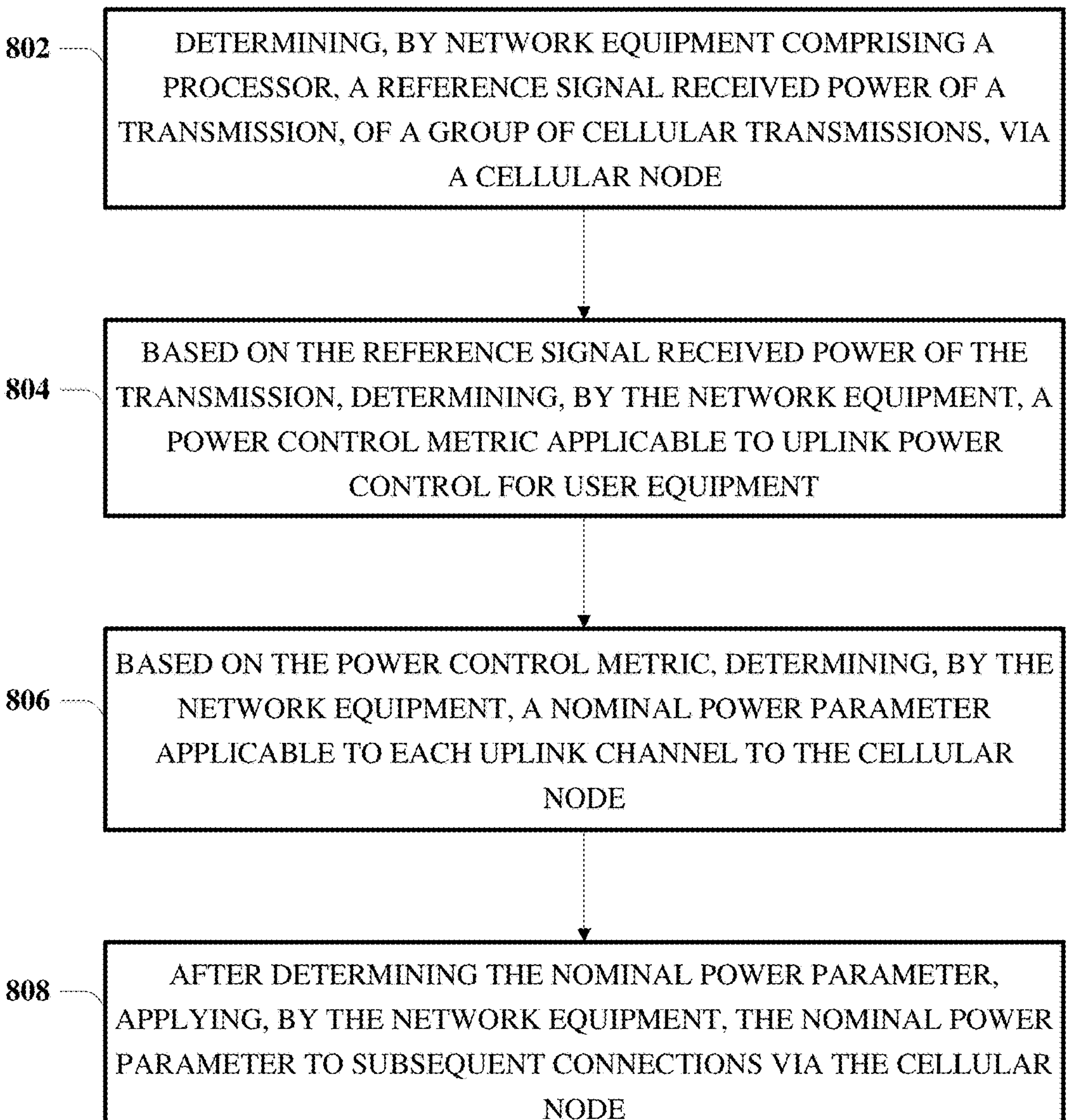
FIG. 8 is a block flow diagram for a process associated with automatic optimization of the nominal power parameter in uplink power control in accordance with one or more example embodiments described herein.

FIG. 8 illustrates a block flow diagram for a process 800 associated with automatic optimization of the nominal power parameter in uplink power control in accordance with one or more embodiments described herein. At 802, the process 800 can comprise determining (e.g., via the data component 110), by network equipment comprising a processor, a reference signal received power of a transmission, of a group of cellular transmissions, via a cellular node (e.g., cellular node 202). At 804, the process 800 can comprise, based on the reference signal received power of the transmission, determining (e.g., via the metric component 112), by the network equipment, a power control metric applicable to uplink power control for user equipment (e.g., UE 204). At 806, the process 800 can comprise, based on the power control metric, determining (e.g., via the nominal power component 114), by the network equipment, a nominal power parameter applicable to each uplink channel to the cellular node (e.g., cellular node 202). At 808, the process 800 can comprise, after determining the nominal power parameter, applying (e.g., via the application component 116), by the network equipment, the nominal power parameter to subsequent connections via the cellular node (e.g., cellular node 202).

Figure 9:
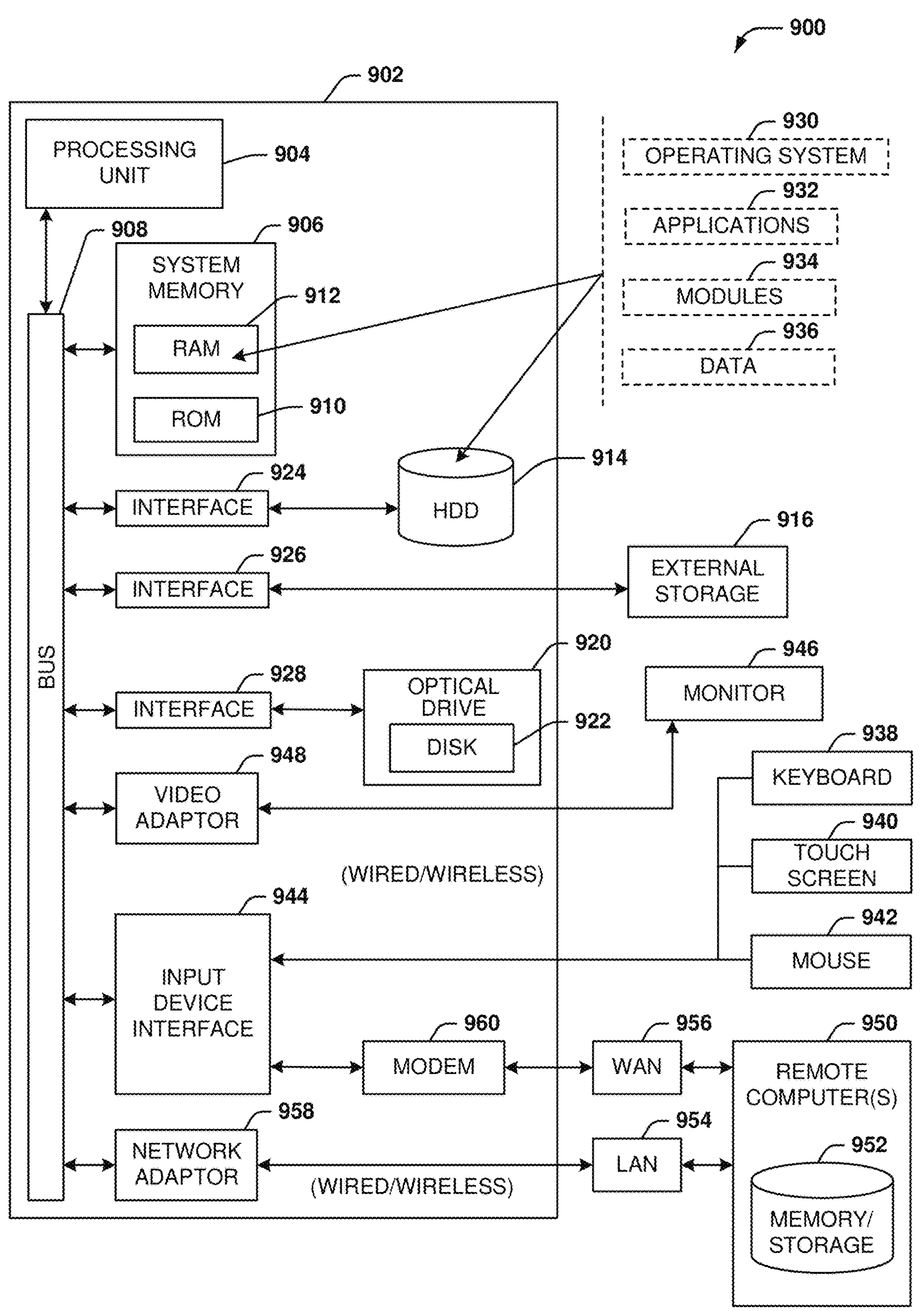
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup.

The RAM 912 can also include a high-speed RAM such as static RAM for caching data. The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
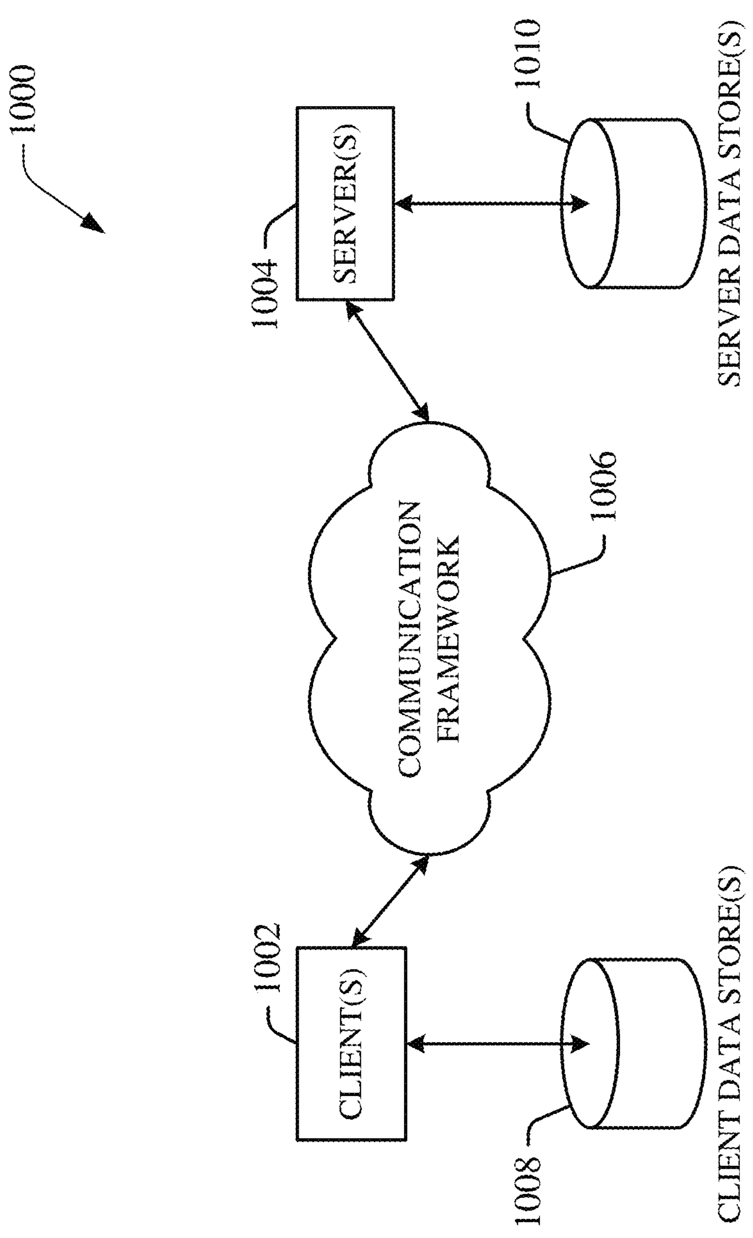
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

determining ratio data representative of a received signal to interference and noise ratio of a transmission, of a group of cellular transmissions, via a cellular node;

based on the ratio data, determining a power control metric applicable to uplink power control for user equipment;

based on the power control metric, determining a nominal power parameter for each uplink channel involving the cellular node; and applying the nominal power parameter to subsequent connections made via the cellular node subsequent to the determining of the nominal power parameter, wherein the nominal power parameter comprises a selected nominal power parameter, selected from a plurality of nominal power profiles, and wherein the selected nominal power parameter is selected based on a location of a user equipment associated with the cellular node.

2. The system of claim 1, wherein the power control metric is a function of a mean of received signal to interference and noise ratios, comprising the received signal to interference and noise ratio, of the transmission.

3. The system of claim 1, wherein the power control metric is a function of a standard deviation of received signal to interference and noise ratios, comprising the received signal to interference and noise ratio, of the transmission.

4. The system of claim 1, wherein the power control metric is a function of a histogram of received signal to interference and noise ratios, comprising the received signal to interference and noise ratio, of the transmission.

5. The system of claim 1, wherein the power control metric is a function of a cumulative distribution function of received signal to interference and noise ratios, comprising the received signal to interference and noise ratio, of the transmission.

6. The system of claim 1, wherein the power control metric is a function of a complementary cumulative distributive function of received signal to interference and noise ratios, comprising the received signal to interference and noise ratio, of the transmission.

7. The system of claim 1, wherein the determining of the nominal power parameter comprises determining the nominal power parameter based on a configured fraction of pathloss to be compensated via the cellular node.

8. The system of claim 1, wherein the determining of the nominal power parameter comprises determining the nominal power parameter based on at least one received signal power measurement of the transmission, of the group of cellular transmissions, via the cellular node.

9. The system of claim 8, wherein the at least one received signal power measurement comprises a received signal strength indicator applicable to the transmission.

10. The system of claim 8, wherein the at least one received signal power measurement comprises a reference signal received power applicable to the transmission.

11. The system of claim 1, wherein the cellular node is part of a self-organizing network.

12. The system of claim 1, wherein the nominal power parameter represents a target normalized received power for each uplink channel involving the cellular node.

13. The system of claim 1, wherein the determining of the power control metric comprises determining the power control metric based on a threshold minimum quantity of data points applicable to the power control metric.

14. The system of claim 1, wherein the determining of the power control metric comprises determining the power control metric in response to a defined threshold amount of time being determined to have elapsed from commencement of the transmission.

15. The system of claim 1, wherein the nominal power parameter comprises a first nominal power parameter of a first nominal power profile associated with a first defined condition, and wherein respective nominal power profiles are employable via the cellular node based on respective defined conditions.

16. The system of claim 15, wherein the respective defined conditions comprise respective times of day.

17. A non-transitory machine-readable medium, comprising executable instructions that, when executed by at least one processor, facilitate performance of operations, comprising:

determining a received signal strength indicator of a transmission, of a group of cellular transmissions, via a cellular node;

based on the received signal strength indicator of the transmission, determining a power control metric applicable to user equipment uplink power control;

based on the power control metric, determining a nominal power parameter of each uplink channel to the cellular node; and using the nominal power parameter for subsequent connections via the cellular node, wherein the nominal power parameter comprises a selected nominal power parameter, selected from a group of nominal power profiles, and wherein the selected nominal power parameter is selected based on a location of a user equipment associated with the cellular node.

18. The non-transitory machine-readable medium of claim 17, wherein the power control metric is based on a cumulative distribution function of received signal strength indicators, comprising the received signal strength indicator, of the transmission.

19. A method, comprising:

determining, by network equipment comprising at least one processor, a reference signal received power of a transmission, of a group of cellular transmissions, via a cellular node;

based on the reference signal received power of the transmission, determining, by the network equipment, a power control metric applicable to uplink power control for user equipment;

based on the power control metric, determining, by the network equipment, a nominal power parameter applicable to each uplink channel to the cellular node; and after determining the nominal power parameter, applying, by the network equipment, the nominal power parameter to subsequent connections via the cellular node, wherein the nominal power parameter comprises a selected nominal power parameter, selected from different nominal power profiles, and wherein the selected nominal power parameter is selected based on a location of a user equipment associated with the cellular node.

20. The method of claim 19, wherein the power control metric comprises an application of a cumulative distribution function of reference signal received powers, comprising the reference signal received power, of the transmission.

* * * * *